(12) United States Patent
Koors

(10) Patent No.: US 6,684,141 B2
(45) Date of Patent: Jan. 27, 2004

(54) ELECTRICAL CIRCUIT MODULE WITH MAGNETIC DETECTION OF LOOSE OR DETACHED STATE

(75) Inventor: Mark A. Koors, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/164,481

(22) Filed: Jun. 6, 2002

(65) Prior Publication Data

US 2003/0229431 A1 Dec. 11, 2003

(51) Int. Cl.⁷ .................. B60R 21/32; G01M 7/00; H01H 35/14
(52) U.S. Cl. .................. 701/45; 280/734; 180/268
(58) Field of Search .................. 701/45; 280/735, 280/734, 801.1; 73/12.04, 488, 514.16, 865.9; 250/559.29; 324/207.24; 180/268, 271; 200/61.45 M, 61.51

(56) References Cited

U.S. PATENT DOCUMENTS

| | | | |
|---|---|---|---|
| 5,010,216 A | * 4/1991 | Sewell et al. ............ | 200/61.45 |
| 5,915,286 A | * 6/1999 | Figi et al. ............... | 73/865.9 |
| 6,082,481 A | * 7/2000 | Engler .................... | 180/268 |
| 6,168,197 B1 | * 1/2001 | Paganini et al. .......... | 280/735 |
| 6,282,942 B1 | * 9/2001 | Husby .................... | 73/12.04 |
| 6,351,994 B1 | * 3/2002 | Pinkos et al. ............ | 73/432.1 |
| 6,421,791 B1 | 7/2002 | Cocco et al. ............. | 714/31 |
| 6,561,544 B1 | * 5/2003 | Clancy, III et al. ........ | 280/735 |
| 6,575,765 B2 | 6/2003 | Gerbsch .................. | 439/66 |

* cited by examiner

Primary Examiner—Tan Q. Nguyen
Assistant Examiner—Dalena Tran
(74) Attorney, Agent, or Firm—Robert M. Sigler; Stefan V. Chmielewski

(57) ABSTRACT

An electric circuit module has a case made of a non-magnetic material. The case has an attachment portion for fixed mounting on a vehicle part made of a magnetic material and a permanent magnet fixed within the case. The module further has a Hall effect sensor fixed within the case in positional relation to the permanent magnet and the attachment portion such that the Hall effect sensor generates a first signal when the attachment portion of the case is fixedly attached to the vehicle part and a second signal different from the first signal when the attachment portion of the case is not so mounted. The module also has an electric circuit in the case with circuit elements responsive to the Hall effect sensor to provide a first mode of operation in response to the first signal and a second mode of operation in response to the second signal. The module is particularly useful when at least one of the electric circuit elements is an accelerometer, for example in a vehicle passive restraint deployment system. In such an application, the Hall effect sensor output indicates the validity of the accelerometer output signal as an indication of accelerations of the vehicle part and can thus help control the use of the accelerometer signal in determining restraint deployment.

15 Claims, 2 Drawing Sheets

ELECTRICAL CIRCUIT MODULE WITH MAGNETIC DETECTION OF LOOSE OR DETACHED STATE

TECHNICAL FIELD

The technical field of this invention is the detection of a loose or detached electrical circuit module.

BACKGROUND OF THE INVENTION

Electrical circuit modules containing accelerometers are generally adapted for mounting in a fixed relationship with some product or device. An example is a control module adapted for mounting on a vehicle seat pan, such as an occupant detection module used in a passive restraint deployment control. Such detection modules may incorporate an accelerometer mounted therein, for example on an electric circuit board, and providing an acceleration signal to a circuit on the board. But if the module becomes loose or detached from the seat pan, or the circuit board becomes loose or detached from the module, the accelerometer will no longer accurately sense and signal the accelerations of the seat pan (or other device) to which it is supposed to be fixed.

SUMMARY OF THE INVENTION

This invention is an electric circuit module adapted for attachment in a mounted position to a vehicle part comprising a magnetic material. The module has a case made of a non-magnetic material and having an attachment portion and a permanent magnet fixed within the case. The module further has a Hall effect sensor fixed within the case in positional relation to the permanent magnet and the attachment portion such that the Hall effect sensor generates a first signal when the attachment portion of the case is fixedly attached to the vehicle part comprising a magnetic material and a second signal different from the first signal when the attachment portion of the case is not so mounted. The module also has an electric circuit in the case with circuit elements responsive to the Hall effect sensor to provide a first mode of operation in response to the first signal and a second mode of operation in response to the second signal. The module is particularly useful when at least one of the electric circuit elements is an accelerometer, for example in a vehicle passive restraint deployment system. In such an application, the accelerometer is fixedly attached to a vehicle body part to indicate the acceleration thereof. Typically, the vehicle body part is made of a magnetic material; and the system will respond to the first signal from the Hall effect sensor, which indicates that the accelerometer is fixedly attached to the vehicle body part, by declaring the accelerometer output signal as valid but will respond to the second signal from the Hall effect sensor, which indicates that the accelerometer is not fixedly attached to the vehicle body part, by declaring the accelerometer output signal as invalid.

DESCRIPTION OF THE PREFERRED EMBODIMENT

Figure 1:
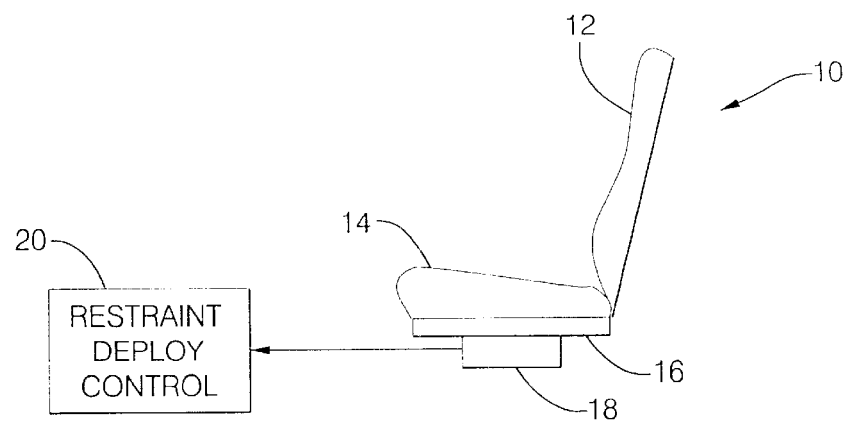
FIG. 1 shows a vehicle seat having an electric circuit module according to this invention fixedly attached to a seat pan.

Referring to FIG. 1, a vehicle seat 10 has a seat back 12 and a seat cushion 14 on a seat pan 16. Seat pan 16 is a vehicle body part typically made of a magnetic material such as steel. An electric circuit module 18 including, for example, an occupant detection system, is fixedly attached to the bottom of seat pan 16 and communicates with a restraint deploy control 20. Module 18 and restraint deploy control 20 are parts of a vehicle passive restraint deployment system. The occupant detection system of module 18 includes an accelerometer for sensing accelerations of the vehicle seat pan 16 for use in determining the occupancy of vehicle seat 10 by a person requiring passive restraint protection.

Figure 2:
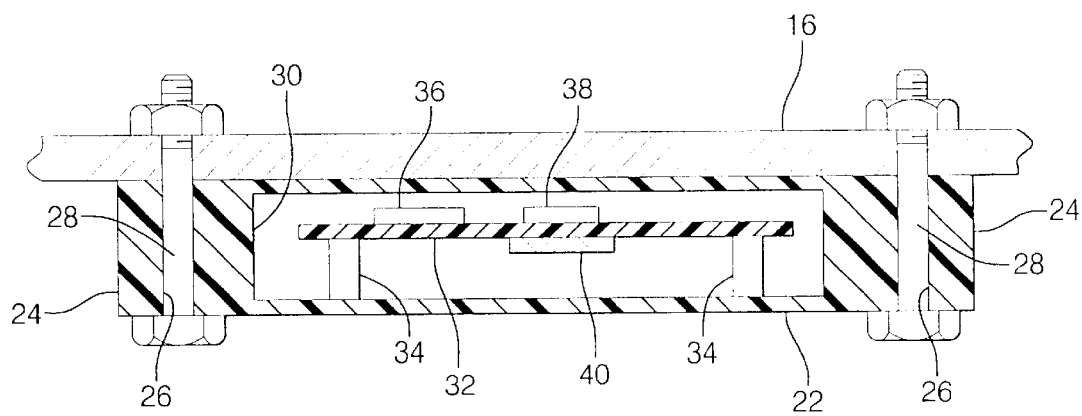
FIG. 2 is a vertical section view of a first embodiment of an electric circuit module according to this invention.
Figure 3:
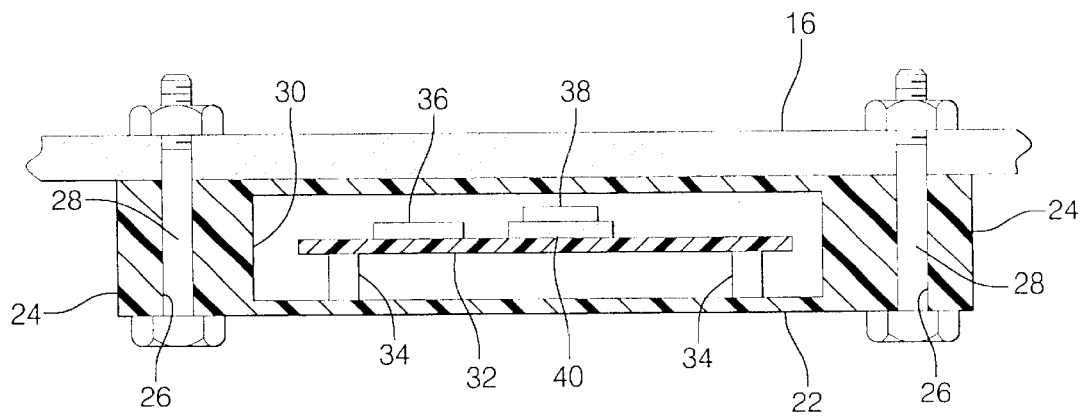
FIG. 3 is a vertical section view of a second embodiment of an electric circuit module according to this invention.

A first embodiment of module 18 is shown in FIG. 2. A case 22 is made of any suitable non-magnetic material, which might be a metal such as aluminum, a hard plastic material, etc. Case 22 has one or more attachment portions 24 provided with through bolt holes 26 by which the module may be fixedly attached to seat pan 16 by bolts 28 or other suitable fasteners. Case 22 defines a central cavity 30 in which an electric circuit board 32 is affixed by supports 34. Circuit board 32 includes and electrical circuit having electric circuit element connected by conductive traces in a known technology. An accelerometer 36 is included in case 22 as one of the electric circuit elements on circuit board 32 as shown for convenience of connection, or separately fixed in case 22 to more closely follow the motion of the case. Accelerometer 36 is part of the restraint deployment system, and is also one of the circuit elements in module 18. It provides an electronic output signal intended to indicate the acceleration of the part of the vehicle to which module 18 is attached: in this embodiment, that part is seat pan 16. The accelerations may, for example, be vertical accelerations of the seat pan intended to help interpret the output of a weight sensor in seat cushion 14 in an occupant sensing operation to determine whether restraint deployment should be suppressed or reduced in force. When module 18 is fixedly attached to seat pan 16, the output signal of accelerometer 36 will correctly indicate the accelerations of seat pan 16; but if it becomes loose or detached from seat pan 16 it will no longer correctly indicate those accelerations.

In order to determine the validity of the output signal of accelerometer 36, a magnetic sensor such as a Hall effect sensor 38 and a magnet 40, preferably a permanent magnet, are provided within case 22, preferably on circuit board 32. In this embodiment, magnet 40 is a permanent magnet and is attached to the side of circuit board 32 opposite Hall effect sensor 38, which is itself attached to circuit board 32 on the side adapted for attachment to seat pan 16. When module 18 is fixedly attached to seat pan 16, the magnetic flux loop between the south and north poles of magnet 40 tends to be concentrated through the portion of seat pan 16 closest to the magnet, and thus also through Hall effect sensor 38. But if module 18 becomes loose or detached from seat pan 16, magnet 40 tends to become more distanced from seat pan 16. The magnetic flux from magnet 40 becomes lower in intensity and/or more scattered, so that less is seen by Hall effect sensor 38. Thus, Hall effect sensor 38, which produces an output voltage signal that varies with the sensed magnetic flux level, will provide different output signal voltages, depending on whether module 18 is fixedly attached to seat pan 16 or becomes loose or detached so as to separate from seat pan 16.

An alternative embodiment of module 18 is shown in FIG. 2, in which identical reference numerals are used. The only specific difference in the embodiment of FIG. 2 is that magnet 40 is mounted on the same side of circuit board 32 as Hall effect sensor 38, between Hall effect sensor 38 and the circuit board. This places magnet 40 closer to seat pan 16 and Hall effect sensor 38, but may create more difficulty in mounting Hall effect sensor 38.

Figure 4:
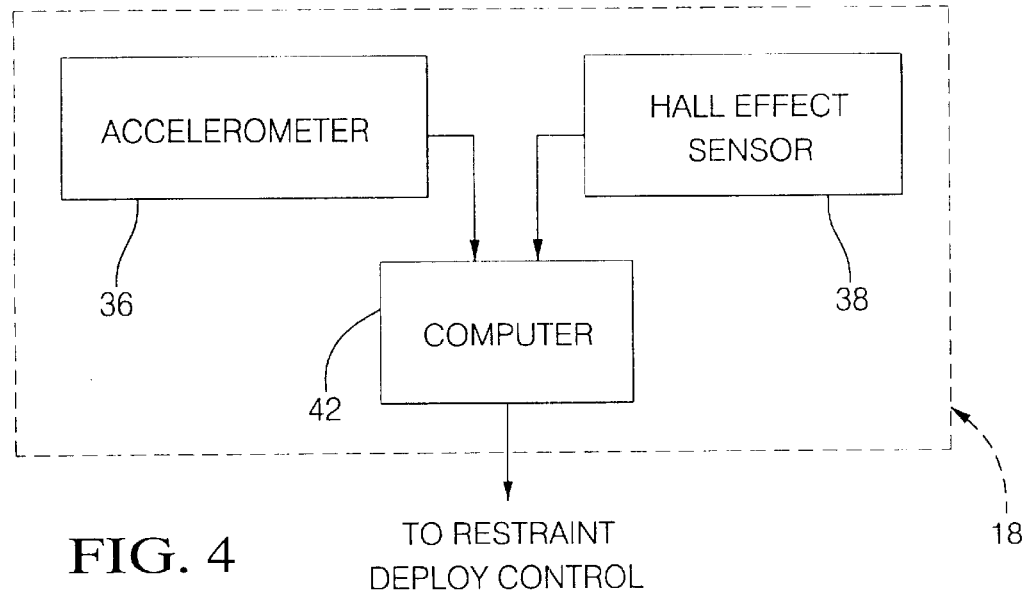
FIG. 4 is a block diagram of an electric circuit housed in the electric circuit module.
Figure 5:
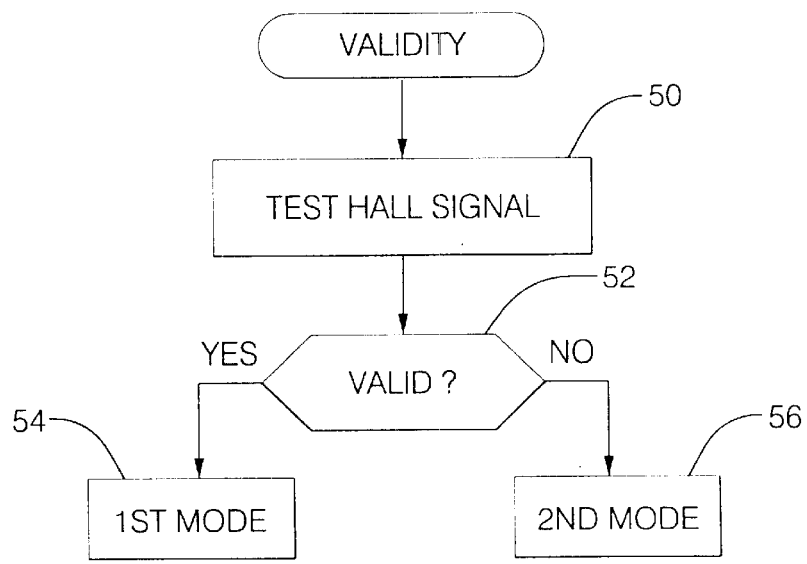
FIG. 5 is a flow chart illustrating the operation of the electric circuit shown in FIG. 4.

The circuit and circuit elements in module 18 are shown in broad, block diagram form in FIG. 4. A microprocessor based digital computer 42 receives the signals from accelerometer 36 and Hall effect sensor 38 and determines the validity of the accelerometer signal. In one embodiment, with the most limited authority, computer 42 provides the accelerometer signal to restraint deployment control 20 along with a determined validity signal if it is valid but does not provide it if it is invalid; and restraint deployment control 20 uses the accelerometer signal provided, along with other information, to determine restraint deployment or suppression. This embodiment would be most appropriate if accelerometer 36 is a crash sensing accelerometer and the accelerometer signal itself is to be provided to restraint deploy control 20. The operation of computer 42 in this regard is described in the flow chart of FIG. 5. Routine VALIDITY begins by testing the signal from Hall effect sensor 38. To do this, computer 42 has at least one calibration threshold stored in non-volatile memory and, at step 50, compares the output voltage from Hall effect sensor 38 with this calibration threshold value. Depending on which value is greater, computer 42 will declare the output signal value of accelerometer 36 to be valid or not valid, such as by determining the value of a stored accelerometer validity flag. At step 52, the computer checks this accelerometer validity flag. If the flag indicates validity, computer 42 proceeds in a first mode of operation in which the accelerometer output signal is provided to restraint deploy control 20. But if the flag indicates no validity, computer 42 proceeds in a second mode of operation in which the accelerometer output signal is not provided to restraint deploy control 20. Restraint deploy control 20 is programmed to use the signal from accelerometer 36 if it is received but to proceed with certain modifications of its own operation if the accelerometer signal is not received.

In a slight variation of the process described above, computer 42 may in each of the first and second modes of operation provide the accelerometer signal along with a signal, such as the value of the accelerometer validity flag, to inform deploy control 20 whether the provided accelerometer signal is valid. In this case the difference between the first and second modes of operation would be the communicated value of the accelerometer validity flag.

In yet another embodiment, the accelerometer signal itself is not provided to restraint deploy control 20; rather, it is used by computer 42 to determine another parameter or value for communication to restraint deploy control 20. For example, in a preferred embodiment, accelerometer 36 is mounted on vehicle seat pan 16 as previously described to detect vertical seat pan vibrations for use in an occupant detection or weight determining system. The value of the accelerometer output would be used in helping to determine a seat occupancy and/or a seat occupant weight signal for communication to restraint deploy control 20 rather than the accelerometer output signal itself. In yet another embodiment, accelerometer 36 could be a satellite crash sensor mounted on some body part; and computer 42 could determine a crash signal using the output of accelerometer 36. In this case, the determined crash signal would be communicated to restraint deploy control 20 rather than the accelerometer signal itself. Various algorithms are known for accomplishing the intended action of each of these embodiments within computer 42; and the specific algorithm chosen is not critical to this invention. In any of these embodiments, the flow chart of FIG. 5 applies in a general, high level description of the process, with some parameter, derived at least in part from the output signal of accelerometer 36, either (1) provided or not provided to restraint control 20 depending on the determined validity of the accelerometer signal, or (2) provided to restraint control 20 along with a signal indicating the determined validity of the accelerometer signal. Other possible hierarchies will be apparent to those of ordinary skill in the art; but all will provide a validity indicating signal from Hall effect sensor 38 for use in evaluating the acceleration signal output of accelerometer 36.

What is claimed is:

1. An electric circuit module adapted for attachment in a mounted position to a vehicle part comprising a magnetic material, the module comprising:

a case made of a non-magnetic material and having an attachment portion;

a permanent magnet fixed within the case;

a Hall effect sensor fixed within the case in positional relation to the permanent magnet and the attachment portion such that the Hall effect sensor generates a first signal when the attachment portion of the case is fixedly attached to a member comprising a magnetic material and a second signal different from the first signal when the attachment portion of the case is not so fixedly attached; and an electric circuit in the case comprising circuit elements responsive to the Hall effect sensor to provide a first mode of operation in response to the first signal and a second mode of operation in response to the second signal, the case being free of any additional magnetic element mounted in a manner permitting movement relative to the Hall effect sensor so as to cause, as a result of such movement, the Hall effect sensor to generate a signal other than the first signal while the attachment portion of the case is fixedly attached to the member comprising a magnetic material.

2. The electric circuit module of claim 1 in which the circuit elements also comprise an accelerometer providing an output signal indicating an acceleration of the module, the output signal thus indicating acceleration of the portion of the vehicle body when fixedly attached thereto.

3. The electric circuit module of claim 2 in which the circuit elements responsive to the Hall effect sensor declare an output signal of the accelerometer to be valid when Hall effect sensor provides the first signal and alternatively declare the output signal of the accelerometer to be invalid when the Hall effect sensor provides the second signal.

4. The electric circuit module of claim 3 further having an electric circuit board fixedly disposed therein and mounting the electric circuit elements including the accelerometer, the Hall effect sensor and the magnet.

5. The electric circuit module of claim 4 in which the circuit elements are part of a vehicle occupant restraint deployment system.

6. The apparatus of claim 4 in which the circuit elements are part of a vehicle occupant restraint deployment system.

7. The apparatus of claim 3 further having an electric circuit board fixedly disposed therein and mounting the electric circuit elements including the accelerometer, the Hall effect sensor and the magnet.

8. The apparatus of claim 2 in which the circuit elements responsive to the Hall effect sensor declare an output signal of the accelerometer to be valid when Hall effect sensor provides the first signal and alternatively declare the output signal of the accelerometer to be invalid when the Hall effect sensor provides the second signal.

9. A vehicle restraint deployment system comprising an electric circuit module fixedly attached in a mounted position to a vehicle part comprising a magnetic material, the module comprising:

a case made of a non-magnetic material and having an attachment portion;

a permanent magnet fixed within the case;

a Hall effect sensor fixed within the case in positional relation to the permanent magnet and the attachment portion such that the Hall effect sensor generates a first signal with the attachment portion of the case in the fixedly attached position but generates a second signal different from the first signal if the attachment portion of the case becomes not so fixedly attached; and an electric circuit in the case comprising circuit elements responsive to the Hall effect sensor to provide a first mode of operation in response to the first signal and a second mode of operation in response to the second signals the case being free of any additional magnetic element mounted in a manner permitting movement relative to the Hall effect sensor so as to cause, as a result of such movement, the Hall effect sensor to generate a signal other than the first signal while the attachment portion of the case is fixedly attached to the member comprising a magnetic material.

10. The electric circuit module of claim 9 in which one of the circuit elements is an accelerometer providing an output signal indicating an acceleration of the module, the output signal thus indicating acceleration of the portion of the vehicle body when fixedly attached thereto.

11. The electric circuit module of claim 10 in which the circuit elements responsive to the Hall effect sensor identify an output signal of the accelerometer as valid when Hall effect sensor provides the first signal and alternatively identifies the output signal of the accelerometer as invalid when the Hall effect sensor provides the second signal.

12. The electric circuit module of claim 11 further having an electric circuit board fixedly disposed therein and mounting the electric circuit elements including the accelerometer, the Hall effect sensor and the magnet.

13. The electric circuit module of claim 11 in which the module is fixedly attached to a vehicle seat pan comprising a ferrous material.

14. An apparatus comprising, in combination:

a vehicle member comprising a magnetically responsive material; and an electric circuit module adapted for attachment in a mounted position to the vehicle member, the module comprising, in combination:

a case made of a non-magnetic material and having an attachment portion attached to the vehicle member near the magnetically responsive material and;

a permanent magnet fixed within the case;

a Hall effect sensor fixed within the case in positional relation to the permanent magnet and the attachment portion such that the Hall effect sensor generates a first signal during a particular motion of the vehicle part if the attachment portion of the case is fixedly attached to the vehicle member and a second signal different from the first signal during the particular motion of the vehicle member when the attachment portion of the case is not so fixedly attached; and an electric circuit in the case comprising circuit elements responsive to the Hall effect sensor to provide a first mode of operation in response to the first signal and a second mode of operation in response to the second signal, the case being free of any additional magnetic element mounted in a manner permitting movement relative to the Hall effect sensor so as to cause, as a result of such movement, the Hall effect sensor to generate a signal other than the first signal while the attachment portion of the case is fixedly attached to the member comprising a magnetic material.

15. The apparatus of claim 1 in which the circuit elements also comprise an accelerometer providing an output signal indicating an acceleration of the module, the output signal thus indicating acceleration of the vehicle member when fixedly attached thereto.

* * * * *